United States Patent [19]

Kondoh et al.

[11] Patent Number: 5,497,041
[45] Date of Patent: Mar. 5, 1996

[54] LOW SPEED GEARED MOTOR

[75] Inventors: Masatoshi Kondoh; Kiyoji Minegishi, Chiba, both of Japan

[73] Assignee: Sumitomo Heavy Industries, Ltd., Tokyo, Japan

[21] Appl. No.: 101,025

[22] Filed: Aug. 3, 1993

[30] Foreign Application Priority Data

Aug. 6, 1992 [JP] Japan ................................. 4-210341

[51] Int. Cl.$^6$ ................................................ H02K 21/12
[52] U.S. Cl. ................................ 310/156; 310/82; 310/83
[58] Field of Search ........................ 310/83, 75 R, 310/156, DIG. 6, 254, 179, 184, 208, 44, 82; 74/640

[56] References Cited

U.S. PATENT DOCUMENTS

| | | | |
|---|---|---|---|
| 3,561,006 | 2/1971 | Humphreys | 310/83 |
| 4,044,274 | 8/1977 | Ohm | 310/83 |
| 4,237,751 | 12/1980 | Davis | 74/640 |
| 4,379,976 | 4/1983 | Pitchford | 310/83 |
| 4,684,836 | 8/1987 | Hart | 310/83 |

FOREIGN PATENT DOCUMENTS 58-42382   9/1983   Japan .
130949     6/1988   Japan .

*Primary Examiner*—R. Skudy
*Attorney, Agent, or Firm*—Nikaido Marmelstein Murray & Oram

[57] ABSTRACT

In a low speed geared motor, a rotational magnetic field is formed in a stator against S-poles and N-poles in a permanent magnetic ring capable of being elliptically deformed. An external gear is rotated while internally meshing with an internal gear by means of rotation of the elliptical deformation caused in the permanent magnetic ring by the rotational magnetic field. As a result, the external gear is rotated on its axis by a difference between the number of teeth in the external gear and that in the internal gear for one rotation of the elliptical deformation. The rotational component is transmitted to an output shaft through a transmission means while absorbing the elliptically deformed component. With this construction, it is possible to enhance the energy conversion efficiency with a small size, to achieve a longer continuous operation, to almost eliminate backlash and hysteresis, to reduce the angular momentum, to improve controllability for starting, stopping or acceleration/deceleration, and to achieve the mass-production with a low cost.

2 Claims, 8 Drawing Sheets

FIG. 4

| COIL / LAYER | A | B | C | D | E | F | G | H | I | J | K | L |
|---|---|---|---|---|---|---|---|---|---|---|---|---|
| 1 | 1-A SHOWN | 1-B SHOWN | 1-C SHOWN | 1-D SHOWN | 1-E SHOWN | 1-F SHOWN | 1-G SHOWN | 1-H | 1-I | 1-J | 1-K | 1-L |
| 2 | 2-A | 2-B | 2-C | 2-D | 2-E | 2-F | 2-G | 2-H | 2-I | 2-J | 2-K | 2-L |
| 3 | 3-A | 3-B | 3-C | 3-D | 3-E | 3-F | 3-G | 3-H | 3-I | 3-J | 3-K | 3-L |
| 4 | 4-A | 4-B | 4-C | 4-D | 4-E | 4-F | 4-G | 4-H | 4-I SHOWN | 4-J SHOWN | 4-K SHOWN | 4-L SHOWN |
| PHASE | U | V | W | U | V | W | U | V | W | U | V | W |

LOW SPEED GEARED MOTOR

BACKGROUND OF THE INVENTION

1. Field of the Invention

The present invention relates to a low speed geared motor using the so-called flexible meshing type planetary gear structure excellent in compactness and heat dissipation.

2. Description of the Prior Art

As reduction gears using a flexible meshing planetary gear structure, there has been known such a type as shown in FIGS. 6 and 7 (Japanese Patent Laid-open No. sho 63-130949).

This reduction gear receives the torque of a motor (not shown) through an input shaft 2, lowers the input shaft speed in a reducing part of a flexible meshing planetary gear structure, and outputs the rotation with a low speed and a large torque from an output shaft 4.

Namely, as the input shaft 2 is rotated, an elliptical eccentric body 8 is rotated through a spline 6. By this rotation, an external gear 12 is rotated through an eccentric body bearing 10 while being deformed in an elliptical shape. The external gear 12 thus deformed meshes with an internal gear 14 at two points in the major axis portion of the external gear 12. Further, since the internal gear 14 is fixed, the external gear 12 is restricted in the free rotation around the axis. As a result, by rotation of the input shaft 2, the above meshing portions are rotated synchronously with the rotation of the input shaft 2.

In this case, the number of teeth in the external gear 12 is set to be smaller than the number of teeth (number of outer pins 14A) in the internal gear 14 by a specified number (2, in this embodiment). Consequently, as the meshing portions are rotated one time by one rotation of the input shaft, the external gear 12 is phase-shifted (rotated around the axis) from the internal gear 14 by a difference in the number of teeth. The rotation around the external gear 12 is transmitted to the output shaft 4 through flange portion 18, while the flexing component (radially deformed component) is absorbed by an annular portion 16 formed integrally with the external gear 12. As a result, when the number of teeth in the external gear is taken as N, a reduction ratio of 2/N can be achieved.

Incidentally, this flexible meshing type planetary gear structure is a power transmission system for transmitting a torque or rotational angle of a motor (in general, an electrically-driven motor or hydraulic motor), and thus never generates power by itself. Namely, in combination with the electrically driven motor, the above planetary gear structure does not function until the electric energy is converted in a torque by the electric motor. Also, in combination with the hydraulic motor, it does not function until the liquid energy is converted into a torque by the hydraulic motor.

In this case, in a process of converting the energy, an energy loss is generated. Further, since the motor itself is rotated at high speed, in the case where the starting, stopping, and/or acceleration/deceleration have to be frequently controlled, an inertia energy stored in the starting or the acceleration tends to be wastefully dissipated as heat through the deceleration or stopping. In this respect, the energy loss is inevitable. Also, as for the control requiring high responsiveness and high positioning accuracy, the inertia energy of the motor rotating at high speed makes it difficult to perform with accurate control.

The motor and the reduction gear, naturally, have to be connected each other using a coupling or a key. This causes backlash in greater or lesser degree between the connected parts. Further, the shaft itself is elastically deformed by the applied torque, and the input shaft, cam, bearing and the like are also elastically deformed, so that hysteresis is generated therein. In the case where both a moving direction and a stopping position have to be controlled, for example, in the revolute joints of a robot, the backlash and the hysteresis make it difficult to perform with accurate control.

To cope with the above problems, there has been proposed such a low speed geared motor as shown in FIGS. 8 and 9. The low speed geared motor mainly includes a stator with 3-phase, 2-pole winding, a flexible rotor 52 which is disposed around the outer periphery of the stator 50 so as to from a magnetic path of a rotational magnetic field and also to be freely deformed in an elliptical shape by the applied magnetic attracting force, external teeth 54 formed around the outer periphery of the flexible rotor 52, and internal teeth 56 disposed around the outer periphery of the external teeth 54. Thus, by electrically rotating the direction of forming the magnetic path of the stator 50, the flexing direction of the flexible rotor 52 is rotated. The meshing positions between the internal teeth 54 and the external teeth 56 are rotated by this rotating flexing direction. Consequently, the rotational component of the flexible rotor 52 is transmitted by the output shaft 62 through a boss 60 provided on the bottom circular portion 58 of the flexible rotor 52. The reduction ratio generated depends on the difference in number of teeth between the internal teeth 56 and the external teeth 54.

This low speed geared motor is not of a type in which the high-speed rotation of a motor is reduced by a reduction gear part to be outputted, but of a type in which the flexible deformation due to a magnetic force is applied to the above-described flexible meshing type planetary gear structure. Therefore, it has a possibility of solving the various problems described above.

However, the low speed geared motor described above has such a disadvantage that, since the stator acting as a heat generating source is positioned at the innermost periphery, the motor is not good for the heat dissipation and is not suitable for long operation. Also, since the stator is constituted of the windings using wires and is disposed in the inside, the central portion of the stator cannot be used as a through hole. This makes it impossible to mount the above motor from both sides by passing an input shaft of a mating member through the central portion of the stator, or to use the central portion as a space through which a cable for transmitting a power or electric signals passes.

Also, since the attracting force for flexing the flexible rotor is structurally generated only by a magnetic field formed by the stator, it is not so large. Accordingly, for keeping a large attracting force, it is required to carefully select the materials of the stator and the flexible rotor, to enlarge the stator and the flexible rotor, and to increase a current applied to the stator. This brings about problems of increasing cost, weight, and dimensions, or of causing the increased power consumption and temperature rise.

SUMMARY OF THE INVENTION

Taking the above circumstances into consideration, the present invention has been made, and an object of the present invention is to basically improve the structure of the low speed geared motor of this type, and to provide a low speed geared motor able to enhance an energy conversion efficiency with a small size, to achieve a longer continuous operation, to almost eliminate backlash and hysteresis, to reduce an inertia force, to improve controllability for starting, stopping or acceleration/deceleration, and to achieve mass-production with low cost.

To solve the above problems, there is provided a low speed geared motor with the following structure:

A flexible permanent magnetic ring is provided, wherein S-poles and N-poles are sequentially disposed in the circumferential direction;

An external gear is positioned around the outer periphery of the permanent magnetic ring. The external gear can be radially deformed together with the permanent magnetic ring;

An internal gear is positioned around the external gear. The internal gear can mesh at the major axis portions of the external gear when the external gear is radially deformed;

A stator is fixed around the outer periphery of the internal gear. The stator generates magnetic poles arranged in correspondence with magnetic poles of the flexible permanent magnetic ring for radially deforming the external gear, and electrically rotates the magnetic poles;

A transmission means is provided to absorb the radially deformed component of the external gear and also to extract only the rotational component of the external gear;

An output shaft is connected to the transmission means to be rotated at the same speed as the rotational component of the external gear.

The above stators may be manufactured in a large quantity with a low cost by linearly disposing a plurality of coil conductive patterns on a ceramic green sheet for forming a coil sheet, winding the coil sheet cylindrically in a plurality of layers such that the coil conductive patterns are arranged in a circumferential direction, and integrally sintering the coil sheet.

The above output shaft is preferably contained in the inner periphery of the permanent magnetic ring and is supported in straddle by bearings axially disposed on both sides of the permanent magnetic ring. Thus, the low speed geared motor can achieve high rigidity, low vibration, low noise, and high positioning accuracy.

In the present invention, to reduce the size and to generate a strong attracting force, there is a flexible permanent magnetic ring in which S-poles and N-poles are sequentially arranged in the circumferential direction. An external gear capable of being radially deformed together with the permanent magnetic ring is disposed around the outer periphery of the permanent magnetic ring. A stator capable of electrically rotating magnetic poles arranged in correspondence with magnetic poles of the permanent magnetic ring is disposed around the outer periphery of the external gear. An internal gear capable of partially meshing with the external gear is fixed around the inner periphery of the stator.

As a result, the attracting force for deforming the external gear is strongly generated by the synergistic effect of the magnetic poles formed by the permanent magnetic ring and the magnetic poles generated by the stator. This makes it possible to obtain a large attracting force in a small power consumption with a small size.

The stator acting as a heat generating source is positioned around the outermost periphery of the geared motor. Accordingly, owing to the geared motor's excellent heat dissipation, and owing to the reduction of the power consumption, temperature rise is kept to a minimum. This enables a longer continuous operation as compared with the prior art motor.

In addition, the output shaft is connected to the external gear through the transmission means and is rotated at the same speed as the external gear. The transmission means absorbs the deformed component of the external gear and extracts the rotational component of the external gear The stator can be manufactured, for example, in the following manner. Namely, a plurality of coil conductive patterns are linearly arranged on a ceramic green sheet to form a coil sheet. The coil sheet is cylindrically wound in a plurality of layers such that the coil conductive patterns are arranged in the circumferential direction After that, the coil sheet is integrally sintered.

This makes it possible to manufacture the stators in a large quantity with a low cost.

The output shaft may be contained in the inner periphery of the permanent magnetic ring and supported in straddle by bearings axially disposed at both sides of the permanent magnetic ring.

This makes it possible to coaxially assemble each component of the reduction gear portion with the output shaft. Further, since the output shaft is supported in straddle, it is possible to obtain a low speed geared motor having a high rigidity, low vibration, low noise, and high positioning accuracy.

BRIEF DESCRIPTION OF THE DRAWINGS

The above and other objects, features and advantages of the present invention will become more apparent from the following description of the invention taken in conjunction with the accompanying drawings, wherein like reference characters designate the same or similar parts, and wherein:

FIG. 4 is a graph showing the relationship between each coil formed by the coil sheet and U, V, and W phases;

DETAILED DESCRIPTION OF THE PREFERRED EMBODIMENTS

Hereinafter, embodiments of the present invention will be explained with reference to the accompanying drawings.

Figure 1:
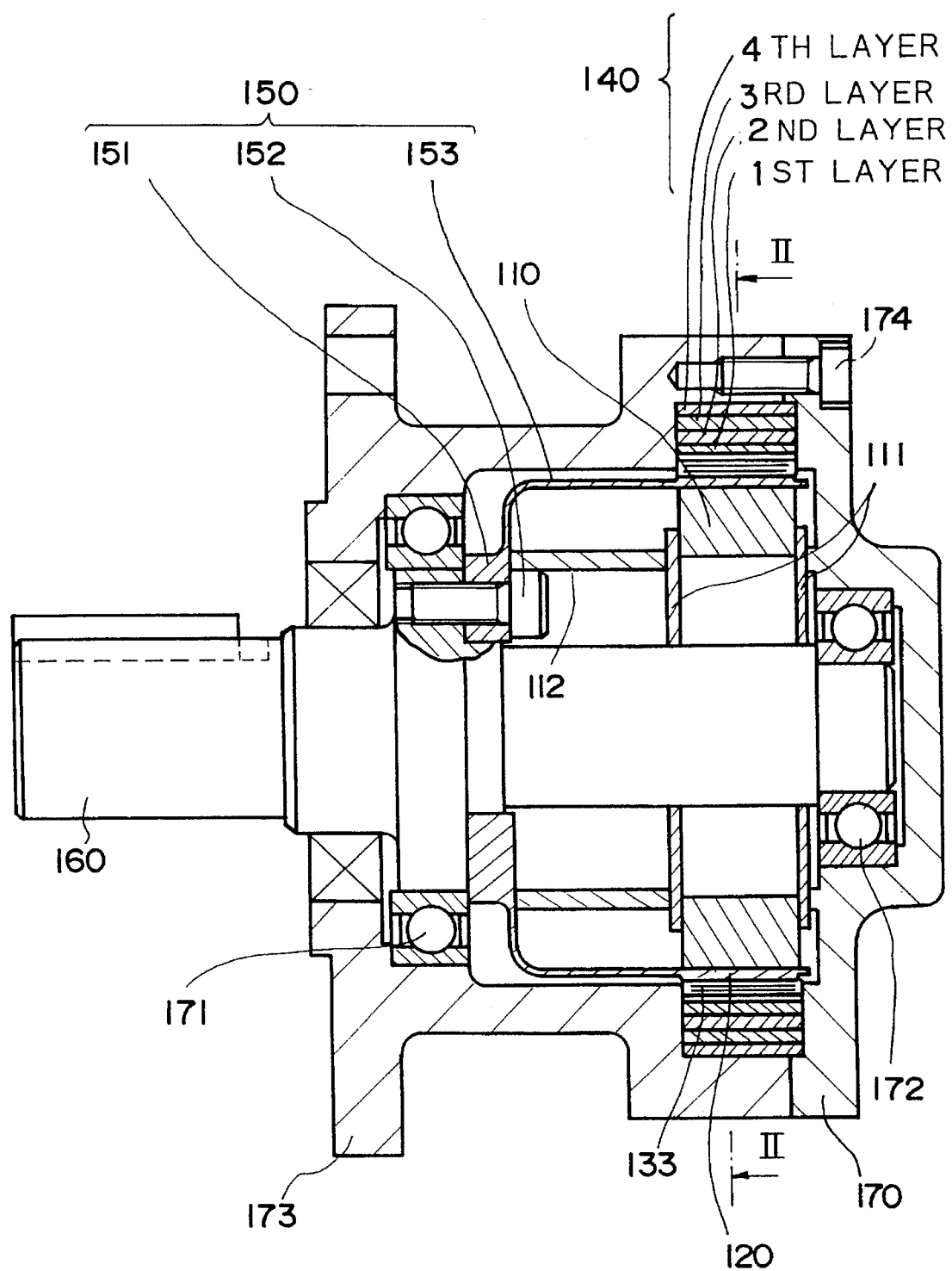
FIG. 1 is a sectional view showing an embodiment of a low speed geared motor according to the present invention.
Figure 2:
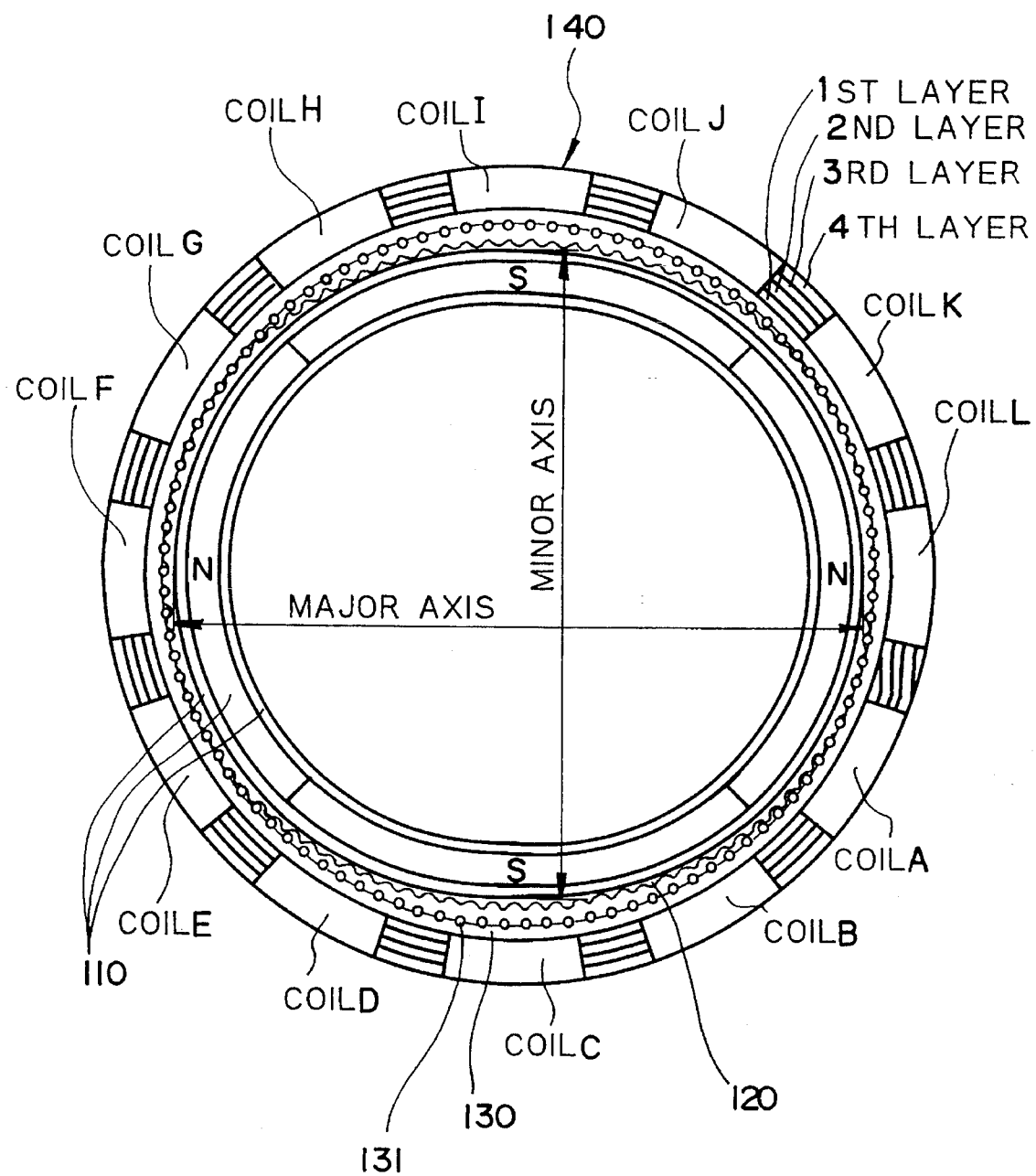
FIG. 2 is a sectional view taken along the line II—II in FIG. 1.

FIG. 1 is a sectional view of a low speed geared motor according to the present invention, and FIG. 2 is a sectional view taken along the line II—II in FIG. 1.

In FIGS. 1 and 2, reference numeral 110 indicates a permanent magnet ring, 120 is an external gear, 130 is an internal gear, 140 is a stator, 150 is a transmission means, and 160 is an output shaft.

The permanent magnet ring 110 is axially positioned by magnet pressers 111. The magnet pressers 111 are axially positioned by a spacer and a cover 170, wherein the spacer 112 is radially positioned by the outer periphery of a bolt 152 for fixing a flange portion 151 to the output shaft 160.

As shown in FIG. 2, the permanent ring 110 is constructed so that two pairs of S-poles and N-poles are sequentially arranged in the circumferential direction. Further, the permanent ring 110 is formed of a flexible material capable of flexing in an elliptical shape.

The external gear 120 is disposed around the outer periphery of the permanent magnet ring 110. The external gear 120 is formed of a non-magnetic material capable of being radially deformed together with the permanent magnet ring 110. The profile of the external teeth of the external gear 120 is not particularly limited. In this embodiment, the known external teeth disclosed in Japanese Patent No. 1,208,548 are used.

The internal gear 130 is positioned around the outer periphery of the external gear 120. The internal gear 130 can mesh with the external gear 120. The number of teeth in the internal gear 130 is set to be larger than the number of teeth in the external gear 120 by a specified number (2, in this embodiment). In addition, in this embodiment, outer pins 131 serve as the substantial internal teeth of the internal gear 130.

The stator 140 is fixed around the internal gear 130. The stator 140 is constructed so that magnetic poles arranged in correspondence with magnetic poles of the permanent magnetic ring 110 can be electrically rotated.

The details of the construction of the stator 140 will be explained later.

The transmission means 150 is constituted of the flange portion 151, the bolt 152 for connecting the flange portion 151 with the output shaft 160, and an annular portion 153 for connecting the flange portion 151 with the external gear 120. Thus, the transmission means 150 connects the external gear 120 with the output shaft 160. The transmission means 150 absorbs the deformed component of the external gear 120 by the annular portion 153, and extracts only the rotational component of the external gear 120 and transmits it to the output shaft 160.

The output shaft 160 passes through the permanent magnet ring 110 and is supported in straddle by bearings 171 and 172. In addition, the reference numeral 174 indicates bolts for connecting a casing 173 with a cover 170.

This low speed geared motor generates a torque by itself, and accordingly, does not have an input shaft for receiving an external input from an electrically driven motor or the like.

Figure 3:
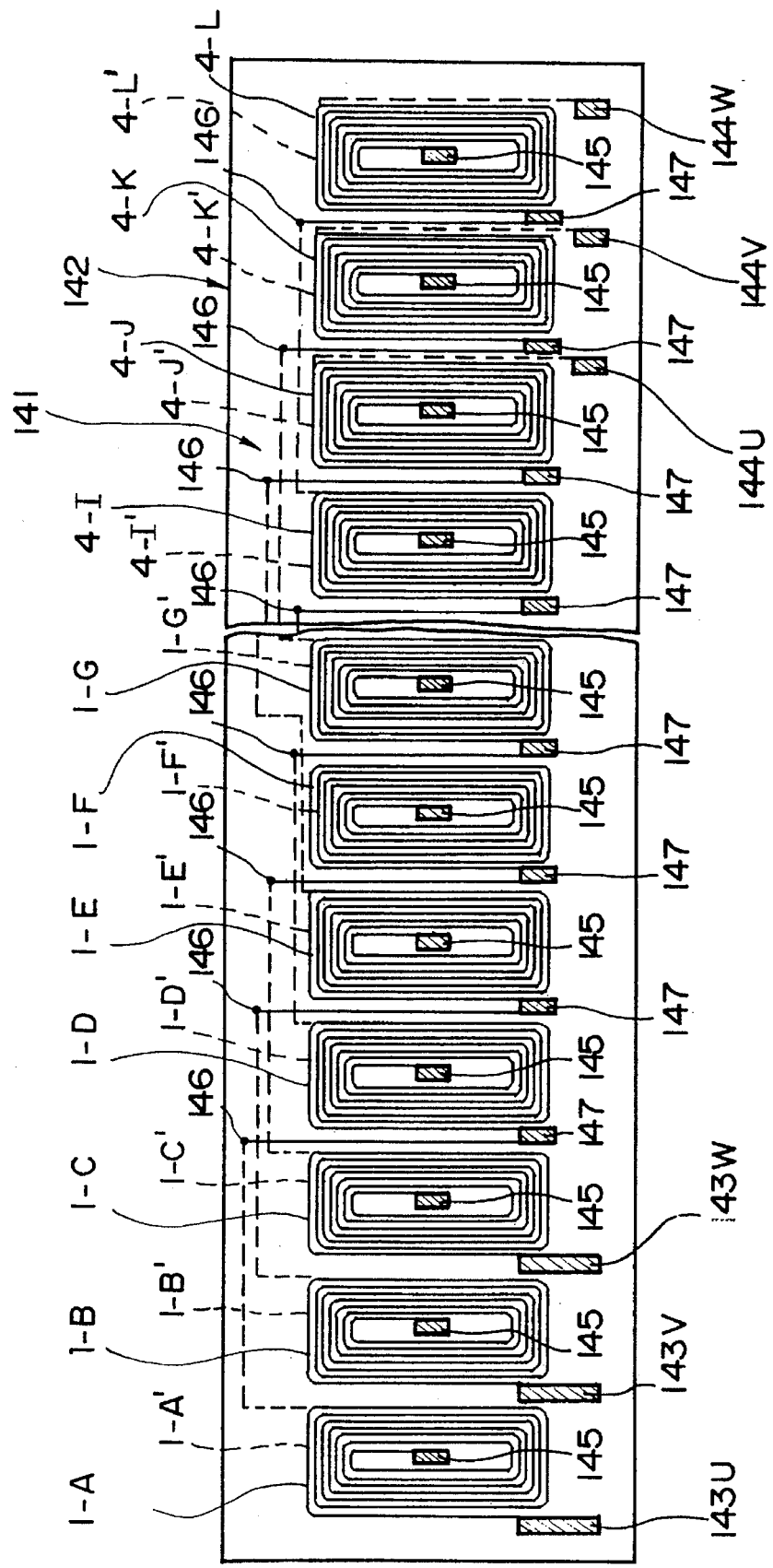
FIG. 3 is a front view showing a coil sheet for manufacturing a stator in the above embodiment.
Figure 5:
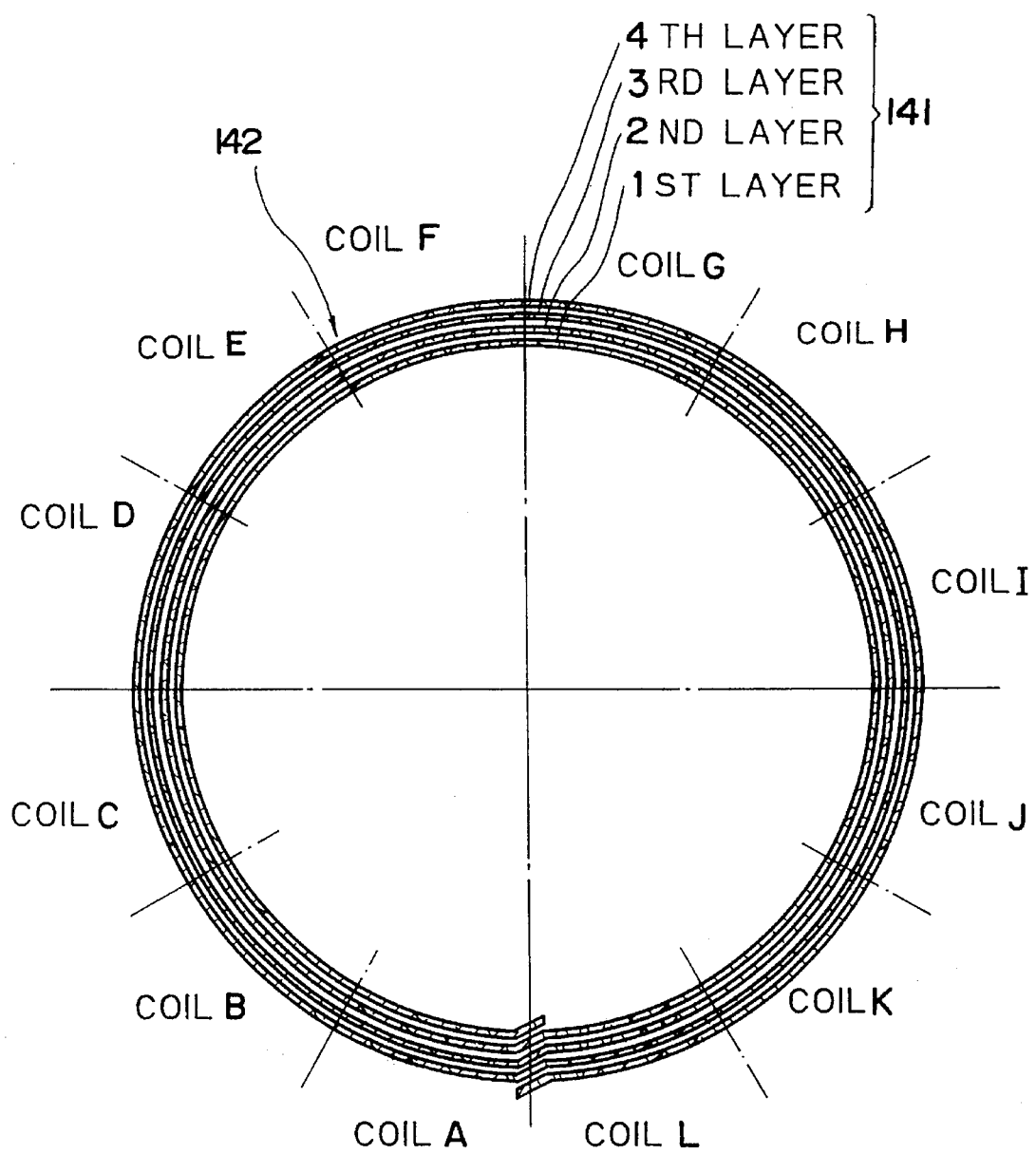
FIG. 5 is a sectional view showing the state for winding the coil sheet in four layers to form each coil.

Now, the construction of the stator 140 will be fully explained with reference to FIGS. 3 to 5.

The stator 140 is manufactured by arranging a plurality of coil conductive patterns on a ceramic green sheet 141 for forming a coil sheet 142, and integrally sintering the coil sheet 142.

More specifically, coil conductive patterns 1-A, 1-B, 1-C, . . . 1-L, 2-A, 2-B, . . . 2-L, 3-A, 3-B, . . . 3-L, 4-A, 4-B, . . . 4-L are linearly arranged on the same plane nearly over the whole surface of the ceramic green sheet 141, to thus form the coil sheet 142.

Each of the coil conductive patterns 1-A, . . . 4-L is formed in a rectangular spiral coil shape. It is formed by a printing wiring technique such as a screen printing technique, a photolithography technique, or a plating technique.

Similarly, coil conductive patterns 1-A', . . . 4-L' are formed on the back side of the ceramic green sheet 141. In the coil conductive patterns, the spiral directions are reversed from each other as seen from the same direction. Accordingly, as seen from the back side, the patterns on the back side are directed in the same spiral direction as those on the front side. Therefore, it is possible to form the coils on the front and back sides by use of the same pattern source.

The coil conductive patterns are connected in series with each other at intervals of two coils and applied with voltages in three phases of U, V and W, respectively. Lead wires are led from both ends of each phase: 143U and 144U from the ends of 1-A and 4-J (U-phase), 143V and 144V from the ends of 1-B and 4-K (V-phase), and 143W and 144W from the ends of 1-C and 4-L (W-phase).

Also, reference numerals 145 and 146 each indicate through-hole electrodes for connecting the conductors on the front and back sides, and 147 indicates each connection interchange portion. These through-holes 145 and 146, and the connection interchange portions 147 are provided to connect the coil conductive patterns in each of the U-, V-, and W-phases in series with each other without any mutual interference.

For example, as for the wiring of the U phase, the coil conductive patterns 1-A, 1-D, . . . 4-G and 4-J are electrically connected in series with each other in this order: lead wire 143U→coil conductive pattern 1-A on the front side→through-hole electrode 145→coil conductive pattern 1-A' on the back side→through-hole electrode 146→connection interchange portion 147→coil conductive pattern 1-D on the front side→through-hole electrode 145→coil conductive pattern 1-D' on the back side→through-hole electrode 146→ . . . through-hole electrode 145→coil conductive pattern 4-J' on the back side→lead wire 144U. In addition, FIG. 4 shows the connection state of each coil conductive pattern as a list.

The coil sheet 142 having 48 coil conductive patterns are wound in four layers such that a coil A is formed by overlapping the coil conductive patterns 1-A, 2-A, 3-A, and 4-A, and a coil B is formed by overlapping the 1-B, 2-B, 3-B and 4-B, and further coils C, . . . L are similarly formed. Thus, a cylindrical pre-sintering stator is formed (see FIG. 5). In addition, when the coil conductor patterns are wound in four layers, a ceramic green sheet with no coil conductive pattern may be overlapped on the coil sheet 142 before being wound so as to prevent the adjacent coil patterns from contacting each other.

Then, the stator is integrally sintered, to thus form a ceramic made cylindrically laminated stator 140. In addition, in this embodiment, a four-layer winding is adopted for the stator 140; however, one layer winding or five or more layer winding may be adopted.

Next, the rotational magnetic field formed by the stator 140 will be explained.

FIG. 2 shows the state in which a voltage is applied to the W phase. When the voltage is applied to the W-phase, coils C, F, I, and L are excited and generate S-poles on the inner peripheral sides thereof. On the other hand, in the permanent magnetic ring 110, the magnetic poles facing the coils F and L are N-poles while the magnetic poles facing the coils C and I are N-poles. Accordingly, the permanent magnet ring 110 is deformed in an elliptical shape such that the sides facing the coils F and L receive a magnetic attracting force to become a major axis, while sides facing the coils C and I, which are shifted by 90° from the coils F and L, receive a magnetic repulsion force to become a minor axis. Next, a voltage is applied to the U-phase, the permanent magnetic ring 110 is deformed to be changed in the angle of the above elliptical deformation such that the sides facing the coils A and G become a major axis, and the sides facing the coils D and J become a minor axis. Further, a voltage is applied to the V-phase, in the permanent magnetic ring 110, S-poles facing the coils B and H generate a magnetic attracting force, while N-poles facing the coils E and K generate a magnetic repulsion force. Consequently, the permanent magnetic ring 110 is deformed in an elliptical shape such that the sides facing the coils B and H become a major axis and the sides facing the coils E and K become the manor axis.

Thus, by sequentially applying a positive or negative voltage to any of the U-, V- or w-phases, the rotational magnetic field is formed, so that the elliptical deformation of the permanent magnetic ring 110 is sequentially shifted as though it were rotated.

The rotation of the elliptical deformation of the permanent magnetic ring 110 becomes the rotation of the elliptical deformation in the external gear 120 disposed around the outer periphery of the permanent magnetic ring 120. This function mechanically works in the same manner as in the case obtained by the elliptical deformation of the outer shape of the external gear 12 through the input shaft 2 and the eccentric body 8.

Namely, as the magnetic field formed by the stator 140 rounds against the internal gear 130 one time, the phase is shifted by the difference between the number of teeth in the external gear 120 and that in the internal gear 130 (number of the outer pins 131). The shifting of the phase, that is, the rotational component of the external gear 140, is extracted to the output shaft 160 through the transmission means 150. In this case, the transmission means 150 absorbs the elliptically deformed component (radially deformed portion) of the external gear 120.

The output shaft 160 can be rotated in an extremely stable state, because it passes through the stator 140 and the permanent magnetic ring 110 and is supported in straddle by the bearings 171 and 172.

The heat generated in the stator 140 is emitted from the casing 173 and the cover 170, which are made of a material of high thermal conductivity, such as aluminum. Since the stator 140 is positioned at the outermost periphery of the geared motor, the heat is effectively emitted. Accordingly, the geared motor can be continuously operated for a longer period as compared with the prior art motor.

Since a ceramic excellent in high thermal conductivity can be selected as the material of the stator 140, the heat emission can be further enhanced. Also, since the laminated coils of the ceramic green sheet can be integrally sintered it is possible to achieve the mass-production with a low cost.

The output shaft is perfectly disposed at the center of the geared motor, and further, it is not required to dispose the winding of the stator at the center of the stator, so that a through-hole can be easily formed at the central portion of the output shaft. Consequently, by the simple change in design, it is possible to use a hollow output shaft, or to use the through-hole for disposing various wirings and the like.

Further, in the prior art, the attracting force is generated only by the magnetic path formed by the stator. In this embodiment, however, the elliptical deformation is realized by the synergistic effect of the magnetic field formed by the permanent magnetic ring 110 and the magnetic field formed by the stator 140. As a result, as compared with the prior art, the geared motor of the present invention can obtain the same load torque with a smaller power consumption, or, obtain a larger load torque for the same power consumption.

Figure 6:
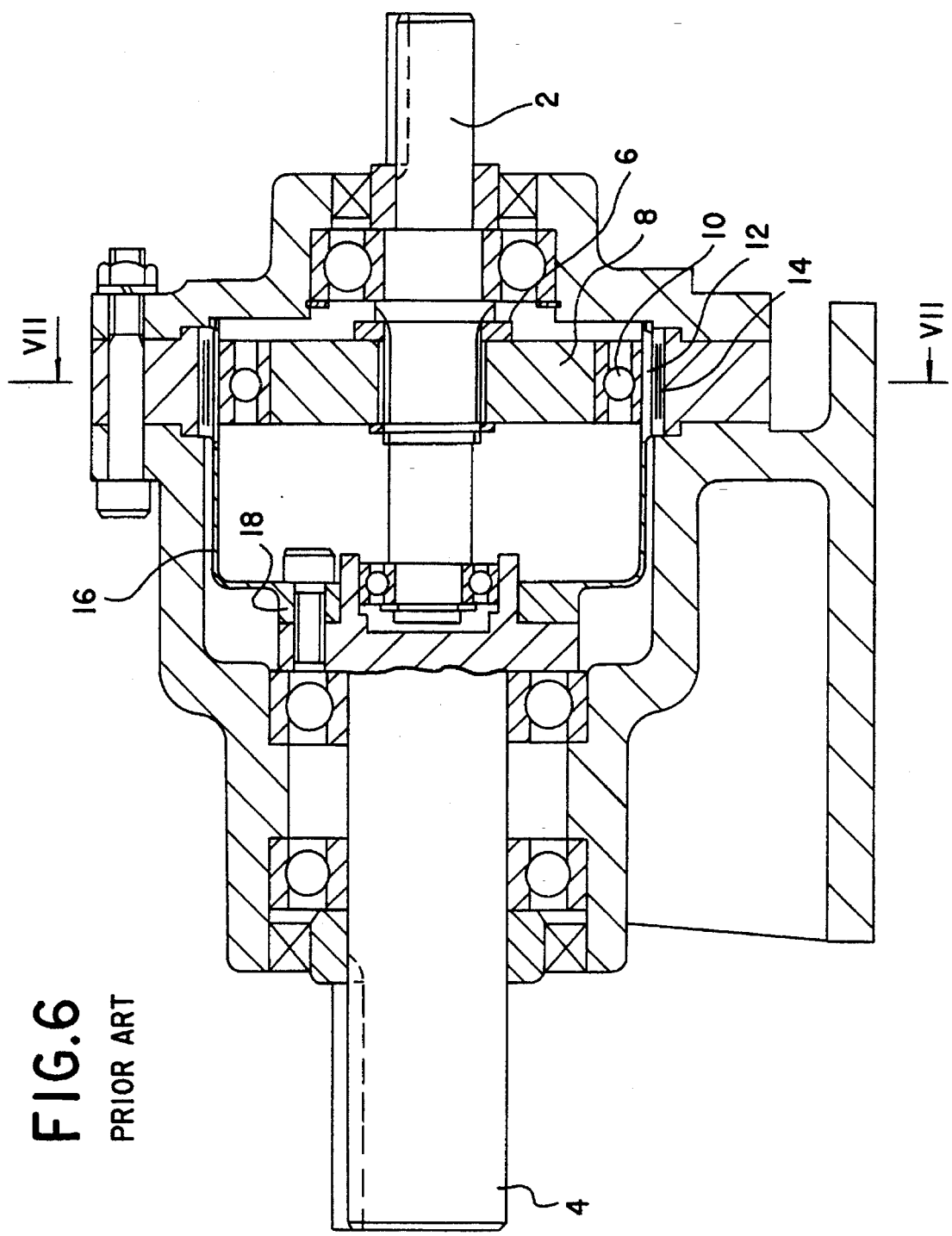
FIG. 6 is a sectional view showing an example of a reduction gear to which a prior art flexible meshing type planetary gear structure is applied.
Figure 7:
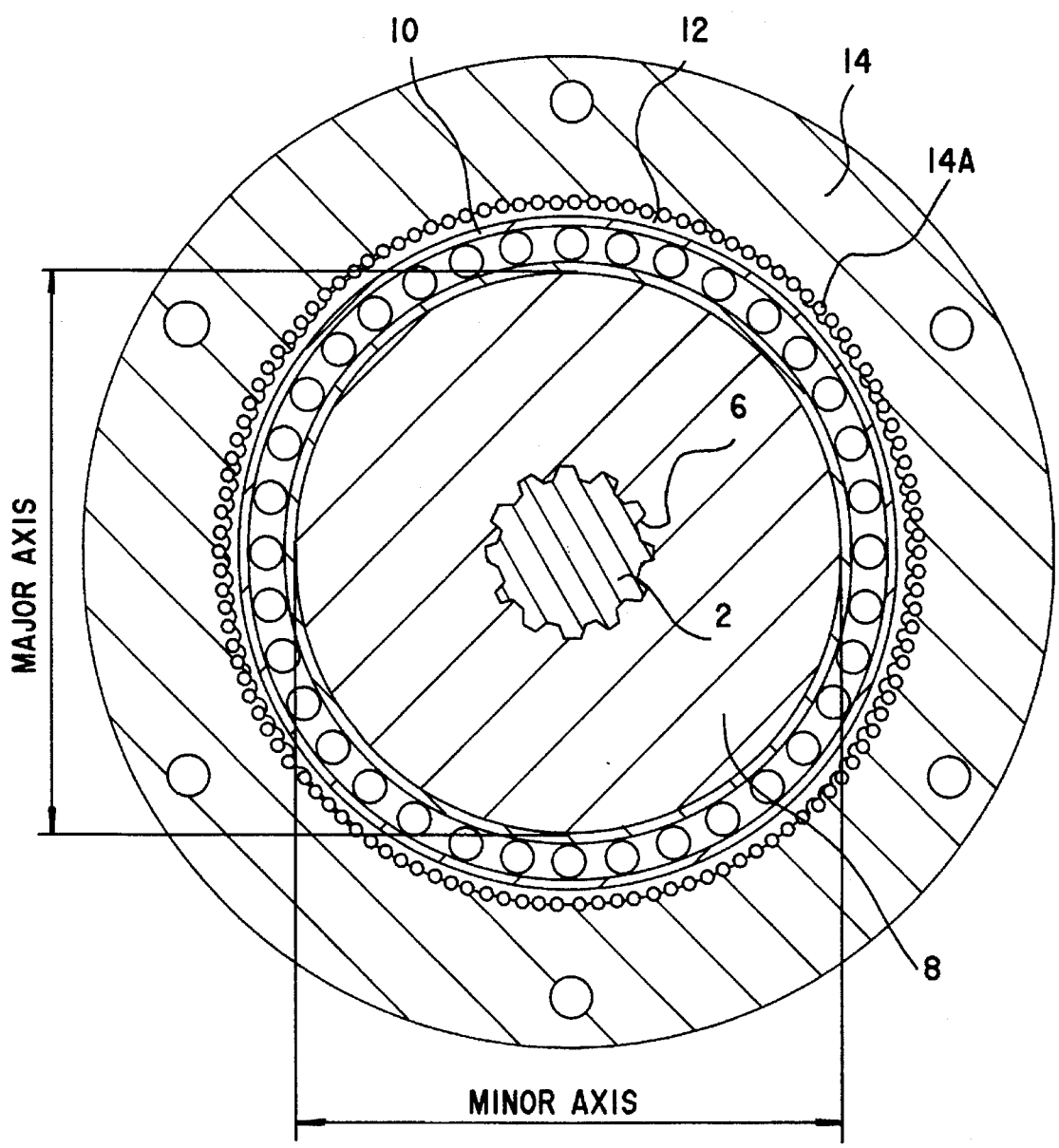
FIG. 7 is a sectional view taken along the line VII—VII in FIG. 6.
Figure 8:
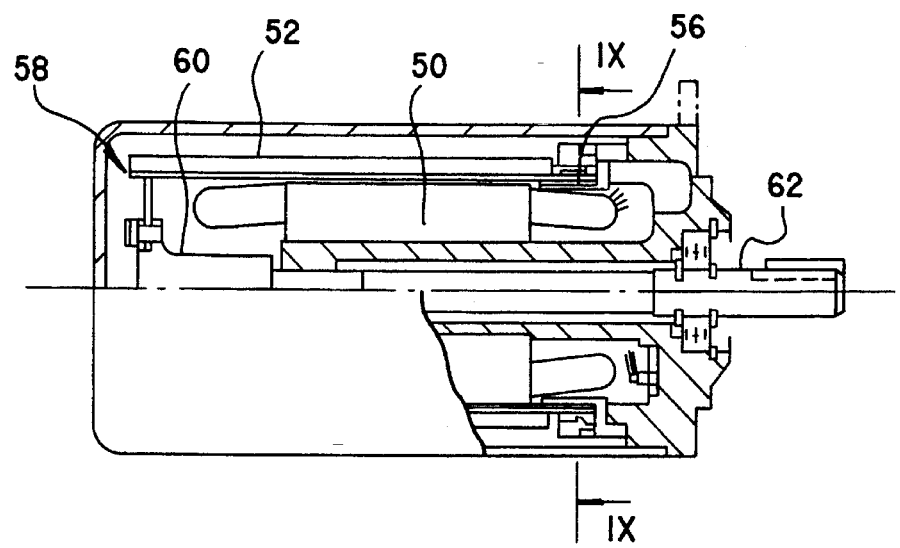
FIG. 8 is a sectional view showing an example of a prior art low speed geared motor using a magnetic force.
Figure 9:
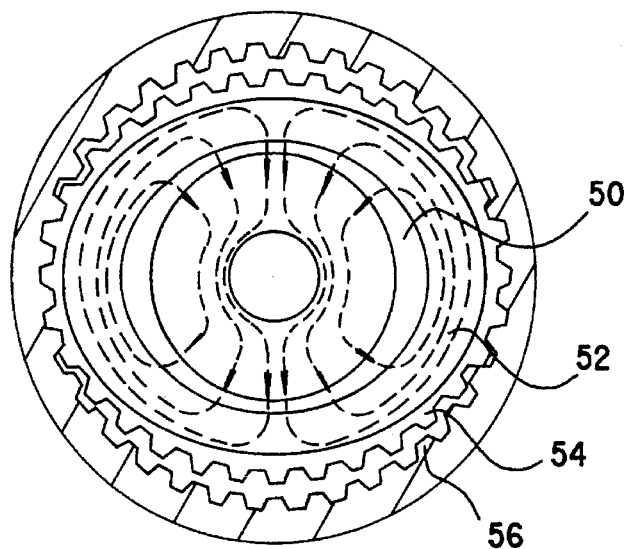
FIG. 9 is a sectional view taken along the line IX–IX in FIG. 8.

The geared motor of the present invention is not of a type in which the rotation of the electrically driven motor and the like is inputted and reduced as the prior art shown in FIGS. 6 and 7, but of a type in which it generates the original rotation by itself, and further the original rotation directly imposes a load on the external gear by a magnetic force due to the stator 140 and the permanent magnetic ring 110. As a result, the present invention eliminates the generation of the mechanical loss, backlash and hysteresis which are generated in the prior art method of inputting the torque of the motor. Thus, it is possible to obtain the geared motor with a high accuracy and a low loss.

Further, the rotating magnetic force itself has no mass, which makes it possible to suppress a GD2 (inertia energy) to a very small value.

Accordingly, the control required the starting, stopping or acceleration/deceleration and the like can be worked very easily and accurately.

As described above, according to the present invention, it is possible to enhance the energy conversion efficiency With a small size, to achieve a longer continuous operation, to almost eliminate backlash and hysteresis, to reduce an inertia force, to improve controllability for starting, stopping or acceleration/deceleration, and to achieve mass-production with a low cost.

What is claimed is:

1. A low speed geared motor comprising:

a flexible permanent magnetic ring in which S-poles and N-poles are sequentially disposed in a circumferential direction;

an external gear positioned around an outer periphery of said flexible permanent magnetic ring and capable of being radially deformed together with said flexible permanent magnetic ring;

an internal gear position around said external gear and capable of meshing with a major axis portions of said external gear when said external gear is radially deformed;

a stator which is fixed around an outer periphery of said internal gear, and which generates magnetic poles arranged in correspondence with magnetic poles of said permanent magnetic ring for radially deforming said external gear and electrically rotates the magnetic poles;

a transmission means for absorbing a radially deformed component of said external gear and for extracting only a rotational component of said external gear; and an output shaft connected to said transmission means to be rotated at the same speed as the rotational component of said external gear.

2. A low speed geared motor according to claim 1, wherein said output shaft is contained in an inner periphery of said permanent magnetic ring, and which is supported in straddle by bearings axially disposed on both sides of said permanent magnetic ring.

\* \* \* \* \*